(12) United States Patent
Ro et al.

(10) Patent No.: US 7,616,430 B2
(45) Date of Patent: *Nov. 10, 2009

(54) CAPACITOR ELECTRODE MEMBER, METHOD FOR MANUFACTURING THE SAME, AND CAPACITOR PROVIDED WITH THE ELECTRODE MEMBER

(75) Inventors: Akinori Ro, Osaka (JP); Zenya Ashitaka, Osaka (JP); Hiroshi Tada, Osaka (JP)

(73) Assignee: Toyo Aluminium Kabushiki Kaisha, Osaka (JP)

( * ) Notice: Subject to any disclaimer, the term of this patent is extended or adjusted under 35 U.S.C. 154(b) by 266 days.

This patent is subject to a terminal disclaimer.

(21) Appl. No.: 11/662,053

(22) PCT Filed: Aug. 31, 2005

(86) PCT No.: PCT/JP2005/015886

§ 371 (c)(1),
(2), (4) Date: Mar. 7, 2007

(87) PCT Pub. No.: WO2006/035569

PCT Pub. Date: Apr. 6, 2006

(65) Prior Publication Data

US 2008/0218945 A1    Sep. 11, 2008

(30) Foreign Application Priority Data

Sep. 29, 2004 (JP) ............................. 2004-283269
Sep. 29, 2004 (JP) ............................. 2004-283270

(51) Int. Cl.
*H01G 9/042* (2006.01)
*H01G 9/045* (2006.01)

(52) U.S. Cl. ....................... 361/529; 361/502; 29/25.03

(58) Field of Classification Search ................. 361/502, 361/523, 528–532; 29/25.03
See application file for complete search history.

(56) References Cited

U.S. PATENT DOCUMENTS 5,621,607 A    4/1997    Farahmandi et al.

(Continued)

FOREIGN PATENT DOCUMENTS

JP    59-108311 A    6/1984

(Continued)

*Primary Examiner*—Eric Thomas
(74) *Attorney, Agent, or Firm*—Birch, Stewart, Kolasch & Birch LLP

(57) ABSTRACT

The invention provides a capacitor electrode member in which layers constituting the electrode member are highly adhesive. The capacitor electrode member comprises aluminum material (1), a carbon-containing layer (2) formed on the surface of the aluminum material (1), and further an interposition layer (3) containing an aluminum element and a carbon element, the interposition layer being formed between the aluminum material (1) and the carbon-containing layer (2). The interposition layer (3) constitutes a first surface portion which is formed on at least a part of the region of the surface of the aluminum material (1) and contains a carbide of aluminum. The carbon-containing layer (2) constitutes a second surface portion (21) formed so as to extend outward from the first surface portion (3). The carbon-containing layer (2) further contains carbon particles (22) and the second surface portion (21) is formed between the first surface portion (3) and the carbon particles (22) and contains a carbide of aluminum.

17 Claims, 2 Drawing Sheets

U.S. PATENT DOCUMENTS

| | | | |
|---|---|---|---|
| 6,219,224 B1 * | 4/2001 | Honda | 361/537 |
| 7,327,556 B2 * | 2/2008 | Ro et al. | 361/502 |
| 7,388,740 B2 * | 6/2008 | Ro et al. | 361/523 |

FOREIGN PATENT DOCUMENTS

| | | |
|---|---|---|
| JP | 10-223487 A | 8/1998 |
| JP | 10-509560 A | 9/1998 |
| JP | 2000-348987 A | 12/2000 |
| JP | 2002-175950 A | 6/2002 |
| JP | 2002-367867 A | 12/2002 |
| JP | 2003-272958 A | 9/2003 |
| JP | 2003-342702 A | 12/2003 |
| JP | 2004-186194 A | 7/2004 |
| WO | WO 2004087984 A1 * | 10/2004 |
| WO | WO 2004088690 A1 * | 10/2004 |

* cited by examiner

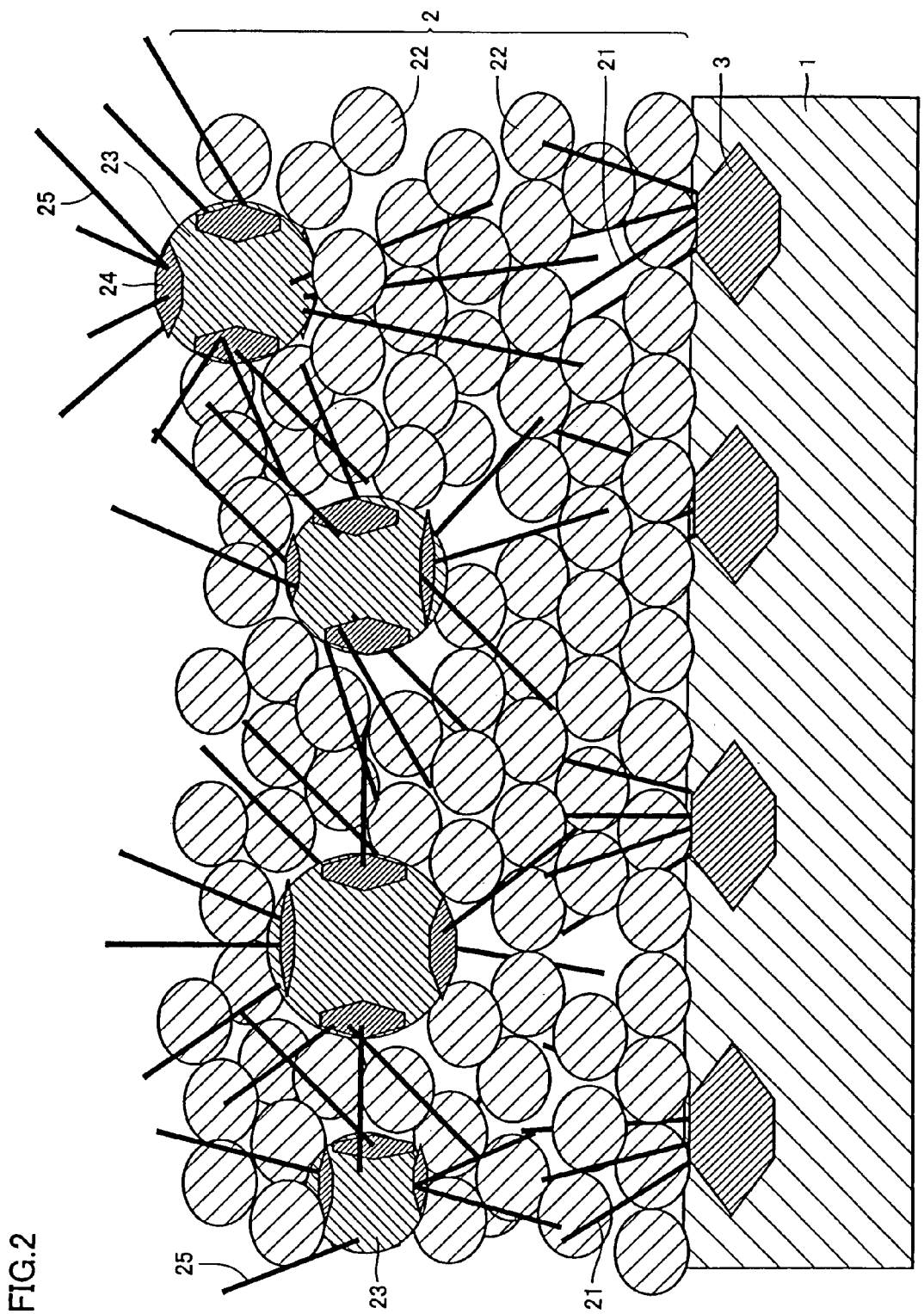

CAPACITOR ELECTRODE MEMBER, METHOD FOR MANUFACTURING THE SAME, AND CAPACITOR PROVIDED WITH THE ELECTRODE MEMBER

TECHNICAL FIELD

This invention generally relates to a solid electrolytic capacitor electrode member, a capacitor electrode member such as an electric double layer capacitor electrode member and a method of manufacturing the capacitor electrode member and a capacitor provided with the electrode member, and particularly to a solid electrolytic capacitor electrode member using an aluminum plate or an aluminum foil as the base material and a functional polymer as the solid electrolyte, and a method of manufacturing the electrode member, a solid electrolytic capacitor using this solid electrolytic capacitor electrode member, an electric double layer capacitor electrode member using an aluminum plate or an aluminum foil as the base material and a method of manufacturing the electrode member, and an electric double layer capacitor using this electric double layer capacitor electrode member.

BACKGROUND ART

Generally, it is strongly desired that an electrolytic capacitor which is one of the types of capacitors used for the secondary side circuit part of a power source circuit and circuit part around the CPU of a personal computer has a small-size and a high capacity. Further, it is demanded of this type of electrolytic capacitor to be improved in a low ESR (equivalent series resistance) in correspondence to high frequency. In order to attain the low ESR, a solid electrolytic capacitor using, as the solid electrolyte, a functional polymer having a high electroconductivity has been developed and put to practical use. Also, there is an increased demand for a polymer solid electrolytic capacitor.

The conventional solid electrolytic capacitor is so constituted that the surface area of an electrode can be enlarged to attain a high capacity. As the structure of the solid electrolytic capacitor to attain this, a cylinder type obtained by winding a continuous electrode or a laminate type obtained by laminating many electrodes is adopted.

For example, in the publication of Japanese Patent Application JP-A No. 59-108311 (Patent Reference 1), there is a description concerning the structure of a laminate type solid electrolytic capacitor electrode in which plural foil-shaped aluminum sheets formed into a specified shape and increased in surface area by etching are laminated and pressed to each other to constitute an aluminum foil laminate, and plural holes penetrating from the top surface to the bottom surface of aluminum foil laminate are formed by drilling.

In the cylinder type solid electrolytic capacitor, an aluminum plate or aluminum foil, or aluminum etched plate or aluminum etched foil provided with a dielectric layer as the anode is used and an aluminum foil or an aluminum etched foil is used as the cathode conductor. In the laminate type solid electrolytic capacitor, an aluminum plate or aluminum foil, or aluminum etched plate or aluminum etched foil provided with a dielectric layer as the anode is used and a graphite paste layer or a silver paste layer is used as the cathode conductor.

The electrolytic layer substantially acts as the cathode. As the material of this electrolytic layer, a functional polymer having high conductivity is used to actually develop a solid electrolytic capacitor having a low ESR. For example, a conductive polymer compound selected from the group consisting of polypyrrol, polyaniline, polythiophene, polyfuran and derivatives of these compounds and especially, polypyrrol, polyaniline, polyethylenedioxythiophene or the like is used for the purpose of developing an electrolytic layer having a low ESR.

However, aluminum material or aluminum etched foil to be used as the cathode conductor in the cylinder type solid electrolytic capacitor has the problem that the resistance (surface resistance) of the interface between this foil and the electrolytic layer is increased because a firm oxide film is formed on the surface thereof. This increase in surface resistance is a hindrance to the development of a cylinder type solid electrolytic capacitor having a low ESR.

In the meantime, it is necessary to enlarge the surface area per unit project areas of the anode and cathode conductors in the solid electrolytic capacitor to attain a small-sized and high-capacity capacitor.

For example, there is a proposal of a solid electrolytic capacitor electrode member in the publication of JP-A No. 2002-367867 (Patent Reference 2), the electrode member comprising an anodic body made of a valve action metal foil constituted of any one of tantalum, niobium and aluminum having a purity of 99% or more and an electrode layer made of a valve action metal powder formed on the anodic body, to attain a small-sized and high-capacity capacitor.

There is also a proposal of a solid electrolytic capacitor electrode member in the publication of JP-A No. 2003-272958 (Patent Reference 3), the electrode member comprising a low-melting point valve action metal foil constituted of a niobium foil and an electrode layer formed on the valve action metal foil by using a valve action metal containing tantalum having a higher melting point than the valve metal foil or its alloy powder, to attain a small-sized and high-capacity capacitor.

However, in these electrode members, the adhesion between the anodic body and the electrode layer is unsatisfactory, so that there is a limitation to these electrode members in increasing the surface area per unit project area, and these electrode members therefore cannot comply with the request for a small-sized and high-capacity capacitor.

In the meantime, the electrode used in an electric double layer capacitor is formed by coating a current collector with an electrode layer prepared by kneading activated carbon and a carbon powder together with a binder. As the current collector, a metal plate or a metal foil of aluminum, copper, stainless steel or the like is used in general.

In order to obtain an electric double layer capacitor having a large capacitance, it is necessary to increase the contact area between the polarizing electrode and the electrolyte by forming a thick electrode layer on the surface of the current collector. However, if the thickness of the electrode layer is increased, there is the problem that the ratio of the capacitance to the active material that is a capacitance per unit weight of the active material existing in the electrode layer is decreased.

Also, if the thickness of the electrode layer is increased, there is the problem that the adhesion in the inside of the electrode layer or at the interface between the electrode layer and the current collector is reduced.

Moreover, if the thickness of the electrode layer is increased, there is the problem that the surface resistance of the electrode is increased and therefore, the ESR (equivalent series resistance) of the electric double layer capacitor is increased. When the ESR of the electric double layer capacitor is increased, it is difficult to constitute a high-output electric double layer capacitor used for a power source for hybrid electric cars.

There have been many studies as to a method of raising the capacitance-to-active material ratio. However, it is necessary to use a binder to finally fix the active material in the current technologies and there is therefore a limitation to an increase in the capacitance-to-active material ratio. Also, if the amount of the binder is decreased to raise the capacitance-to-active material ratio, cracks and breakdowns of the electrode layer are easily caused when manufacturing, particularly, electrodes such as cylinder type electric double layer capacitors needing a high capacitance. It is therefore difficult to increase the capacitance-to-active material ratio of the electric double layer capacitor.

Various studies have been made as to a method of improving the adhesion between the electrode layer and the current collector.

In the publication of JP-A No. 10-223487 (Patent Reference 4), there is a disclosure of an electric double layer capacitor electrode produced by applying a polarizing electrode member to one surface of a metal foil whose surface is treated by etching to form a polarizing electrode layer and then by reducing the thickness to 80% to 90% the original thickness by rolling.

The publication of JP-A No. 2000-348987 (Patent Reference 5) discloses a method of manufacturing an electric double layer capacitor electrode by overlapping a flexible metal foil and an activated carbon cloth prepared by making fibrous activated carbon into a fabric form on each other and pressing the both against each other to produce a double layer electrode member provided with the metal foil layer and the activated carbon layer having a given thickness, wherein after the metal foil is overlapped on the activated carbon cloth, a press plate formed with plural projections is brought into contact with and pressed against the metal foil side to press-fit the projections to the inside of the activated cloth through the metal foil.

Disclosed in the publication of JP-A No. 2002-175950 (Patent Reference 6) is a method of manufacturing an electric double layer capacitor electrode body in which an electrode layer containing a carbonaceous material and a first binder is formed on at least one surface of a metal current collector foil, the method involving the following steps A to D. Here, the step A is a process of applying a conductive adhesive containing a conductive powder, a second binder and a solvent to at least one surface of the metal current collector foil, the step B is a process of drying the metal current collector foil coated with the conductive adhesive to remove at least a part of the solvent, thereby forming a conductive adhesive layer, the step C is a process of manufacturing a sheet-like molded body containing the carbonaceous material and the first binder, and the step D is a process of placing the sheet-like molded body on the conductive adhesive layer to form a laminate of the metal current collector body and the sheet-like molded body and by rolling the laminate to reduce the thickness of the sheet-like molded body by 5 to 60%, thereby forming an electrode layer comprising the sheet-like molded body.

Also, there is a disclosure as to a method of manufacturing an electric double layer capacitor electrode sheet in the publication of JP-A No. 2004-186194 (Patent Reference 7), the method comprising carrying out a step of manufacturing a lengthy sheet-like electrode having a given thickness from a molding material containing a carbonaceous powder, a conductive adjuvant and a binder and then a step of laminating the sheet-like electrode on the surface of the lengthy conductive foil through a conductive adhesive, wherein the laminating step is carried out by laminating the sheet-like electrode with applying the conductive adhesive to the surface of the conductive foil in a thickness of 10 µm or less by using a gravure coater.

However, in the electric double layer capacitor electrode disclosed in each publication of JP-A Nos. 10-223487 and 2000-348987 (Patent References 4 and 5), it is difficult to integrate the current collector with the electrode layer because oxides and hydroxides exist at the interface between the metal foil as the current corrector and the electrode layer when the both are stuck to each other.

Also, in the electric double layer capacitor electrode body or electric double layer capacitor electrode sheet disclosed in each publication of JP-A Nos. 2002-175950 and 2004-186194 (Patent References 6 and 7), it is difficult to integrate the current collector with the electrode layer because the existence of a conductive adhesive as the adhesive agent is inevitable.

For this, there is the case where such a phenomenon occurs that the electrode layer is peeled from the current collector when the electric double layer capacitor is charged or discharged. This resultantly gives rise to the problem that the charge and discharge characteristics of the electric double layer capacitor are deteriorated.

Patent Reference 1: Publication of JP-A No. 59-108311
Patent Reference 2: Publication of JP-A No. 2002-367867
Patent Reference 3: Publication of JP-A No. 2003-272958
Patent Reference 4: Publication of JP-A No. 10-223487
Patent Reference 5: Publication of JP-A No. 2000-348987
Patent Reference 6: Publication of JP-A No. 2002-175950
Patent Reference 7: Publication of JP-A No. 2004-186194

DISCLOSURE OF THE INVENTION

Problems to be Solved by the Invention

To mention the outline of the problem to be solved by this invention, it is an object of this invention to provide a capacitor electrode member in which a layer constituting the electrode member has high adhesiveness.

Especially, in the case of an electrode member to be used for a solid electrolytic capacitor which is one type of capacitor, it is an object of this invention to solve the above problem and to provide a solid electrolytic capacitor electrode member which is reduced in surface resistance and can attain a low ESR.

Also, another object of this invention is to provide a solid electrolytic capacitor electrode member which ensures that the surface area of the electrode per unit project area can be increased and a high capacitance can be attained.

A still another object of this invention is to provide a method of manufacturing a solid electrolytic capacitor electrode member which ensures a low ESR and high capacitance.

A further object of this invention is to provide a solid electrolytic capacitor using the solid electrolytic capacitor electrode member which ensures a low ESR and high capacitance.

Especially, in the case of an electrode member to be used for an electric double layer capacitor which is one type of capacitor, it is an object of this invention to solve the above problem and to provide an electric double layer capacitor electrode member in which the electrode layer is strongly stuck to the current collector.

Another object of this invention to provide an electric double layer capacitor electrode member having a low surface resistance.

A still further object of this invention is to provide an electric double layer capacitor electrode member having a high capacitance-to-active material ratio.

A further object of this invention is to provide a method of manufacturing an electric double layer capacitor electrode member which is improved in the adhesion of the electrode layer to the current collector, reduced in surface resistance and has a high capacitance-to-active material ratio.

A still further object of this invention is to provide an electric double layer capacitor using an electric double layer capacitor electrode member which is improved in the adhesion of the electrode layer to the current collector, reduced in surface resistance and has a high capacitance-to-active material ratio.

Means for Solving the Problems

The inventors of this invention have made earnest studies to solve the above prior art problem and as a result, found that a capacitor electrode member which can attain the above object can be obtained by making a carbon-containing material stick to the aluminum material, followed by heating in a specified condition. This invention was thus completed based on the findings of the inventors.

A capacitor electrode member according to this invention comprises aluminum material and a carbon-containing layer formed on the surface of the aluminum material, and further comprises an interposition layer containing an aluminum element and a carbon element, the interposition layer being formed between the aluminum material and the carbon-containing layer.

When a capacitor electrode member according to this invention is used as the electrode member of a solid electrolytic capacitor which is a type of capacitor, the interposition layer formed between the aluminum material and the carbon-containing layer works to improve the adhesion between the aluminum material and the carbon-containing layer. Accordingly, there is no increase in resistance inside of the electrode member and there is no inhibition to the development of a low ESR capacitor. Also, the carbon-containing layer works to enlarge or increase the surface area of the aluminum material. It is therefore possible to attain a small-sized and high-capacitance solid electrolytic capacitor by using the electrode member of the present invention.

Also, when a capacitor electrode member according to this invention is used as the electrode member of an electric double layer capacitor which is a type of capacitor, the interposition layer formed between the aluminum material and the carbon-containing layer works to improve the adhesion between the aluminum material and the carbon-containing layer. Accordingly, there is no increase in resistance at the interface between the carbon-containing layer as the electrode layer and the aluminum material as the current collector. Therefore, since the surface resistance is reduced, it is possible to constitute a high-output electric double layer capacitor by using the electric double layer capacitor electrode member of the present invention.

Also, because a binder is not necessarily used in the electric double layer capacitor electrode member, there is no binder in the electrode layer and it is therefore possible to constitute an electric double layer capacitor electrode member having a high capacitance-to-active material ratio.

Also, in the capacitor electrode member of this invention, the interposition layer constitutes a first surface portion which is formed on at least a part of the surface of the aluminum material and contains a carbide of aluminum. The carbon-containing layer constitutes a second surface portion formed such that the second surface portion extends towards the outside from the first surface portion.

In such a structure, the second surface portion works to increase the surface area of the aluminum material. Also, since the first surface portion containing a carbide of aluminum is formed between the aluminum material and the second surface portion, this first part works to improve the adhesion to the second surface portion which increases the surface area of the aluminum material. This ensures that when a capacitor electrode member according to this invention is used as the electrode member of a solid electrolytic capacitor which is a type of capacitor, an improvement in the adhesion of the carbon-containing layer and an increase in the surface area can be attained more efficiently.

Also, in this case, the first surface portion containing a carbide of aluminum is formed between the aluminum material and the second surface portion and therefore, this first part works to improve the adhesion to the second surface portion which increases the surface area of the aluminum material. This makes it possible to attain an improvement in the adhesion between the carbon-containing layer as the electrode layer and the aluminum material as the current collector more efficiently in the case where a capacitor electrode member according to this invention is used as the electrode member of an electric double layer capacitor which is a kind of capacitor.

Moreover, in the capacitor electrode member of this invention, the carbon-containing layer further contains carbon particles, and the second surface portion is formed between the first surface portion and the carbon particles and contains a carbide of aluminum.

In such a structure, the adhesion between the carbon-containing layer and the aluminum material can be retained exactly even if a thick carbon-containing layer is formed.

This structure makes it possible to retain the adhesion between the carbon-containing layer as the electrode layer and the aluminum material as the current collector more exactly even if a thick carbon-containing layer is formed, in the case where a capacitor electrode member according to this invention is used as the electrode member of an electric double layer capacitor which is a kind of capacitor.

When the capacitor electrode member of the present invention which is constituted in the above manner is used as the electrode member of a solid electrolytic capacitor which is a kind of capacitor, the carbon-containing layer exists on the surface of the aluminum material in place of the oxide film and therefore the development of a solid electrolytic capacitor having a low ESR can be attained without any rise in surface resistance.

Also, in the case where a capacitor electrode member of the present invention constituted in the above manner is used as the electrode member of an electric double layer capacitor which is a kind of capacitor, the carbon-containing layer exists on the surface part of the aluminum material in place of the oxide film and therefore the development of an electric double layer capacitor having a low ESR can be attained without any rise in surface resistance.

In the capacitor electrode member of this invention, the carbon-containing layer contains aluminum particles besides carbon particles and preferably further contains an aluminum particle surface portion which is formed in at least a part of the surface of the aluminum particles and contains a carbide of aluminum and an aluminum particle outside part which is formed in such a manner as to extend to the outside of the surface of the aluminum particles from the surface of the aluminum particles and contains a carbide of aluminum. In this case, even if a thicker carbon-containing layer is formed, the adhesion inside of the carbon-containing layer can be improved with the result that peeling can be prevented.

In the capacitor electrode member of this invention, the carbon-containing layer preferably contains an interposition material having an aluminum element and a carbon element inside thereof.

When the carbon-containing layer is thin, the adhesion between the aluminum material and the carbon-containing layer can be more improved than those conventionally in use by only the existence of the above interposition layer. However, when the carbon-containing layer is thick, there is the possibility that this gives rise to peeling inside of the carbon-containing layer. In this case, the adhesion inside of the carbon-containing layer can be improved by the formation of the interposition material containing an aluminum element and a carbon element in the carbon-containing layer, whereby peeling can be prevented.

Therefore, when a capacitor electrode member according to this invention is used as the electrode member of an electric double layer capacitor which is a kind of capacitor, the surface resistance of the electrode member is not increased and therefore the ESR is low. Therefore, a high-output electric double layer capacitor can be constituted by using the capacitor electrode member of the present invention.

The above interposition material is preferably a compound of an aluminum element and a carbon element. Also, the carbon-containing layer is preferably a compound of an aluminum element and a carbon element.

In the capacitor electrode member of this invention, the carbon-containing layer is preferably formed in such a manner as to extend outward from the surface of the aluminum material. In this case, the carbon-containing layer produces the effect of enlarging or increasing the surface area of the aluminum material more efficiently.

When a capacitor electrode member according to this invention is used as the electrode member of an electric double layer capacitor which is a kind of capacitor, the carbon-containing layer produces the effect of enlarging or increasing the surface area of the electrode layer to thereby improve the capacitance-to-active material ratio more efficiently.

When a capacitor electrode member according to this invention is used as the electrode member of a solid electrolytic capacitor which is a kind of capacitor, the thickness of the aluminum material is preferably 5 μm or more and 1 mm or less.

Also, when the capacitor electrode member of this invention is used as the electrode member of a solid electrolytic capacitor which is a kind of capacitor, the carbon-containing layer may be formed on at least one surface of the aluminum material and the thickness of the carbon-containing layer is preferably 0.01 μm or more and 5 mm or less.

When the capacitor electrode member of this invention is used as the electrode member of an electric double layer capacitor which is a kind of capacitor, the thickness of the aluminum material as the current collector is preferably 5 μm or more and 1 mm or less.

When the capacitor electrode member of this invention is used as the electrode member of an electric double layer capacitor which is a kind of capacitor, it is only required for the carbon-containing layer used as the electrode layer to be formed on at least one surface of the aluminum material and the thickness of the carbon-containing layer is preferably 0.01 μm or more and 10 mm or less.

A capacitor according to this invention is provided with a capacitor electrode member having any one of the above characteristics. This renders it possible to attain the development of a solid electrolytic capacitor having a low ESR and a high capacitance when the capacitor electrode member of this invention is used as the electrode member of a solid electrolytic capacitor which is a kind of capacitor. When the capacitor electrode member of this invention is used as the electrode member of an electric double layer capacitor which is a kind of capacitor, the electric double layer capacitor can be made to have a high output and a high capacitance.

A method of manufacturing a capacitor electrode member according to this invention comprises a step of sticking a carbon-containing material to the surface of aluminum material and a step of heating the above aluminum material provided with the carbon-containing material stuck the surface thereof in the situation that the above aluminum material is disposed in a space containing a hydrocarbon-containing material.

In the manufacturing method of this invention, not only the surface of the aluminum material can be coated with the carbon-containing layer but also the interposition layer containing an aluminum element and a carbon element can be formed between the aluminum material and the carbon-containing material layer by carrying out such a simple step of sticking a carbon-containing material to the surface of the aluminum material and heating the above aluminum material in the situation that the above aluminum material is disposed in a space containing a hydrocarbon-containing material. The adhesion between the aluminum material and the carbon-containing layer can be thereby improved.

Effect of the Invention

As mentioned above, according to the capacitor electrode member of this invention, the adhesion of the layer constituting the electrode member can be improved.

Also, when the capacitor electrode member of this invention is used as the electrode member of a solid electrolytic capacitor which is a kind of capacitor, not only the surface resistance can be reduced but also the capacitance of the solid electrolytic capacitor can be increased. Also, if this solid electrolytic capacitor electrode member is used to constitute a solid electrolytic capacitor, the development of a solid electrolytic capacitor having a low ESR and a high capacitance can be attained.

Moreover, when the capacitor electrode member of this invention is used as the electrode member of an electric double layer capacitor which is a kind of capacitor, the adhesion between the carbon-containing layer as the electrode layer and the aluminum material as the current collector is improved and therefore, the surface resistance can be reduced and also, the capacitance-to-active material ratio can be improved. Also, if the electric double layer capacitor electrode member of this invention is used to constitute an electric double layer capacitor, the development of an electric double layer capacitor having a high-output and a high capacitance can be attained.

BRIEF DESCRIPTION OF THE DRAWINGS

FIG. 2 is a view schematically showing the sectional structure of a solid electrolytic capacitor electrode member or an electric double layer capacitor electrode member which is a capacitor electrode member in another embodiment according to this invention.

EXPLANATION OF REFERENCE NUMERALS

Figure 1:
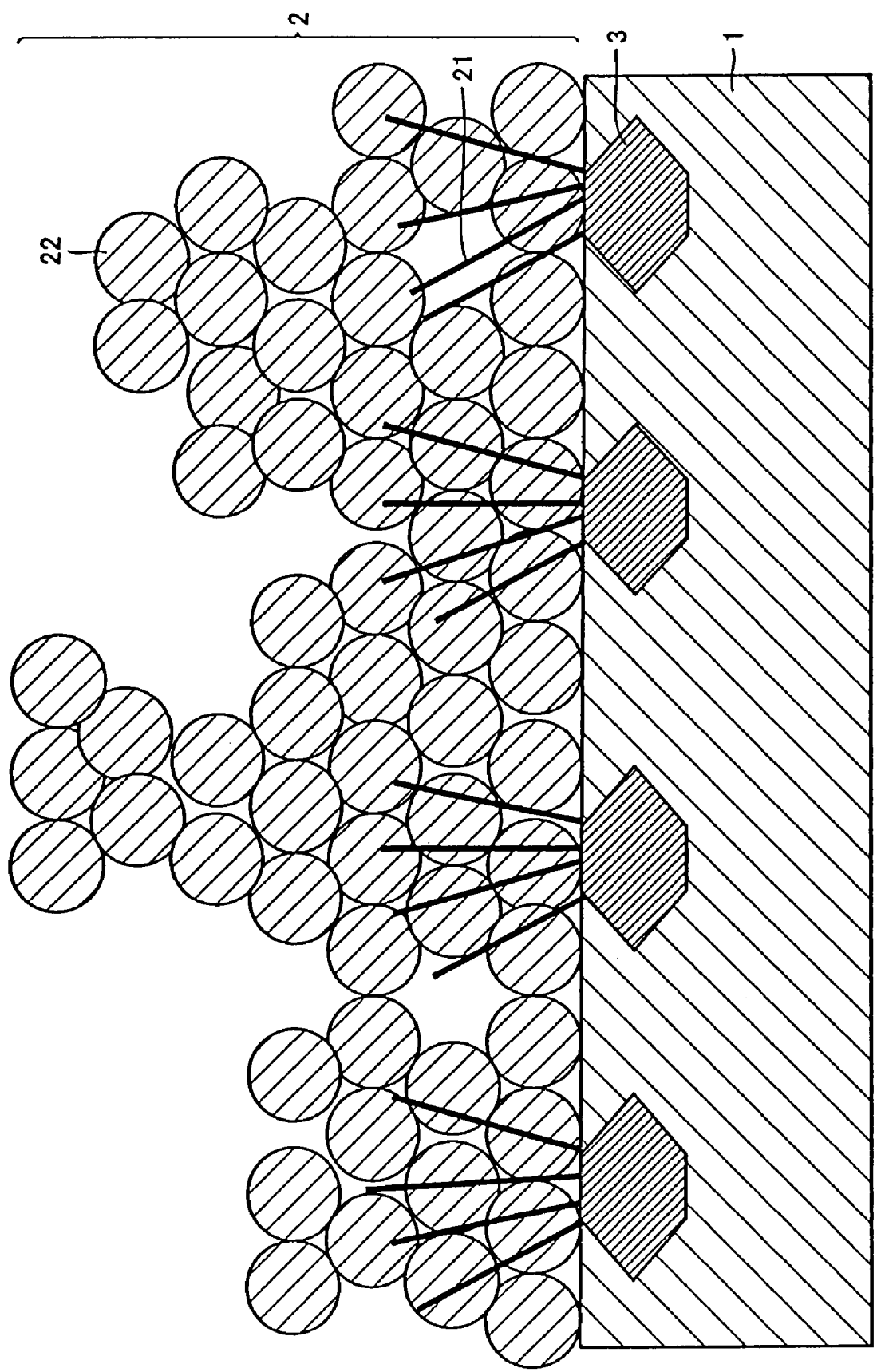
FIG. 1 is a view schematically showing the sectional structure of a solid electrolytic capacitor electrode member or an electric double layer capacitor electrode member which is a capacitor electrode member in one embodiment according to this invention.

1: Aluminum material, 2: Carbon-containing layer, 3: Intervening layer (first surface portion), 21: Second surface portion, 22: Carbon particles, 23: Aluminum particles, 24: Aluminum particle surface part, 25: Aluminum particle outside part

BEST MODE FOR CARRYING OUT THE INVENTION

In the sectional structure of a solid electrolytic capacitor electrode member or an electric double layer capacitor electrode member which is a capacitor electrode member in one embodiment according to this invention as shown in FIG. 1, a carbon-containing layer 2 is formed on the surface of an aluminum material (aluminum plate or aluminum foil) 1. An interposition layer 3 containing an aluminum element and a carbon element is formed between the aluminum material 1 and the carbon-containing layer 2. The carbon-containing layer 2 is formed in such a manner as to extend outward from the surface of the aluminum material 1. The interposition layer 3 constitutes a first surface portion which is formed on at least a part of the surface of the aluminum material 1 and contains a carbide of aluminum. The carbon-containing layer 2 includes a second surface portion 21 formed in such a manner as to extend outward from the first surface portion 3 in a fibrous state or filament state. The second surface portion 21 is a compound of an aluminum element and a carbon element. Also, the carbon-containing layer 2 further contains a number of carbon particles 22. The second surface portion 21 is extended outwards from the first surface portion 3 in a fibrous state or filament state outward, formed between the first surface portion 3 and the carbon particles 22 and contains a carbide of aluminum.

In another embodiment of the present invention, as shown in FIG. 2, the solid electrolytic capacitor electrode member or electric double layer capacitor electrode member which is a capacitor electrode member has the same sectional structure that is shown in FIG. 1. The carbon-containing layer 2 further contains a large number of carbon particles 22 and a large number of aluminum particles 23. The second surface portion 21 is extended outwards from the first surface portion 3 in a fibrous state or filament state, formed between the first surface portion 3 and the carbon particles 22 and contains a carbide of aluminum. Moreover, the aluminum particle surface part 24 is formed on at least one region of the surface of the aluminum particles 23 and contains a carbide of aluminum. An aluminum particle outside part 25 is formed in such a manner as to extend to the outside of the surface of the aluminum particles 23 from the aluminum particle surface part 24 in a cactus form and contains a carbide of aluminum.

The aluminum material constituting the base material of a solid electrolytic capacitor electrode member in one embodiment of this invention or aluminum material used in a method of manufacturing a solid electrolytic capacitor electrode member in one embodiment of the invention is an aluminum plate or an aluminum foil. The solid electrolytic capacitor electrode member of this invention is preferably used for any of anode or cathode conductors.

The aluminum material constituting the base material of an electric double layer capacitor electrode member in one embodiment of the invention or aluminum material used in a method of manufacturing an electric double layer capacitor electrode member in one embodiment of the invention is an aluminum plate or an aluminum foil.

As to the solid electrolytic capacitor electrode member of this invention, it is only required for the carbon-containing layer to be formed on at least one surface of the aluminum material and the thickness of the carbon-containing layer is preferably in a range from 0.01 μm to 5 mm. Particularly, the thickness is preferably in a range from 1 μm to 5 mm in the case of an anode and in a range from 0.5 μm to 300 μm in the case of a cathode conductor.

The solid electrolytic capacitor electrode member of this invention is preferably a polymer solid electrolytic capacitor electrode member in which aluminum material is used as the base material and a highly conductive functional polymer as the solid electrolyte.

In the electric double layer capacitor electrode member of this invention, it is only required for the carbon-containing layer to be formed on at least one surface of the aluminum material. The thickness of the carbon-containing layer is preferably in a range from 0.01 μm to 10 mm, and particularly preferably in a range from 1 μm to 1 mm.

The aluminum material used as the base material on which the carbon-containing layer is to be formed in the aforementioned one embodiment or another embodiment according to the present invention is not particularly limited, and pure aluminum or an aluminum alloy may be used as the aluminum material. The aluminum material used in the present invention includes aluminum alloys in which, as ingredients, at least one alloy element such as lead (Pb), silicon (Si), iron (Fe), copper (Cu), manganese (Mn), magnesium (Mg), chromium (Cr), zinc (Zn), titanium (Ti), vanadium (V), gallium (Ga), nickel (Ni) and boron (B) is added in a necessary range or aluminum material in which the content of the above unavoidable elements of impurities is limited.

The thickness of the aluminum material is preferably in a range from 5 μm to 1 mm though there is no particular limitation to it. Particularly, in the solid electrolytic capacitor electrode member of this invention, the thickness of the aluminum material is preferably in a range from 20 μm to 1 mm in the case of an anode and 5 μm to 200 μm in the case of a cathode conductor. Particularly, in the electric double layer capacitor electrode member, the thickness of the aluminum material is preferably in a range from 5 μm to 20 μm.

As the above aluminum material, one produced by a well known method may be used. For example, a molten bath of aluminum or aluminum alloy having the above specified composition is prepared and is then cast to obtain an ingot, which is then subjected to homogenization. Thereafter, this ingot is subjected to hot rolling and cold rolling, whereby the aluminum material can be obtained. In this case, the ingot may be subjected to intermediate annealing treatment at a temperature range from 150° C. to 400° C. during the course of the above cold rolling process.

There is no particular limitation to the type of hydrocarbon-containing material to be used in one embodiment of the method of manufacturing a capacitor electrode member according to the present invention. Examples of the type of the hydrocarbon-containing material include paraffin type hydrocarbons such as methane, ethane, propane, n-butane, isobutane and pentane, olefin type hydrocarbons such as ethylene, propylene, butene and butadiene and acetylene type hydrocarbons such as acetylene or derivatives of these hydrocarbons. Among these hydrocarbons, paraffin type hydrocarbons such as methane, ethane and propane are preferable because these hydrocarbons are gasified in the process of heating the aluminum material. Any one of methane, ethane and propane is more preferable and methane is most preferable. Further, when the hydrocarbon-containing material is a liquid, the hydrocarbon-containing material may be filled solely or together with an inert gas so as to vaporize in the closed space.

Also, the hydrocarbon-containing material may be used in either a liquid or gas state in the production method of the present invention. It is only necessary for the hydrocarbon-containing material to exist in a space where the aluminum material is present and the hydrocarbon-containing material may be introduced into the space where the aluminum material is placed by using any method. When the hydrocarbon-containing material is, for example, in a gas state (for example, methane, ethane or propane), it is only necessary to fill in the closed space where the aluminum material is heat-treated, with the hydrocarbon-containing gas independently or in combination with inert gas.

No particular limitation is imposed on the pressure in the heating atmosphere in the process of heating the aluminum material and the aluminum material may be heated under normal pressure, reduced pressure or pressure. Also, the pressure may be adjusted at any time while the aluminum material is kept at a fixed temperature, the temperature of the aluminum material is raised to a specified temperature or the temperature of the aluminum material is dropped from the specified temperature.

The ratio by weight of the hydrocarbon-containing material to be introduced into the space where the aluminum material is to be heated is usually designed to be in a range preferably from 0.1 parts by weight to 50 parts by weight and particularly preferably from 0.5 parts by weight to 30 parts by weight based on 100 parts by weight of the aluminum though no particular limitation is imposed on it.

In the process of heating the aluminum material, heating is usually carried out at a temperature from preferably 450° C. or more and less than 660° C. and more preferably 530° C. or more and 620° C. or less though it may be designed according to the composition of the aluminum material which is a subject to be heated. In the production method of the present invention, the case of heating the aluminum material at a temperature less than 450° C. is not excluded and it is only necessary for the aluminum material to be heated at temperatures exceeding at least 300° C.

The heating time is usually in a range from one hour to 100 hours though depending on the heating temperature.

When the heating temperature is 400° C. or more, the concentration of oxygen in the heating atmosphere is designed to be preferably 1.0 vol % or less. In the case where the heating temperature is 400° C. or more and the concentration of oxygen in the heating atmosphere exceeds 1.0 vol %, a thermal oxidation film on the surface of the aluminum material is enlarged and there is therefore a fear that the surface resistance of the surface of the aluminum material is increased. There is therefore a fear that the surface resistance of the electric double layer capacitor electrode member which is one type of the capacitor electrode member of the present invention is raised.

Also, the surface of the aluminum material may be surface-roughened prior to the heat treatment. No particular limitation is imposed on the surface-roughening method and well known technologies such as washing, etching or blasting may be used.

After the carbon-containing material is stuck to the surface of the aluminum material or when the carbon-containing layer is formed in a high thickness in the production method of the present invention, a process is adopted in which after the carbon-containing material and an aluminum powder are stuck to each other and then the aluminum material is heated in a space containing the hydrocarbon-containing material. In this case, as the carbon-containing material stuck to the surface of the aluminum material, any of an activated carbon fiber, activated carbon cloth, activated carbon felt, activated carbon powder, Indian ink, carbon black, graphite or the like may be used. Also, a carbon compound such as silicon carbide may be preferably used. As to a sticking method, the above carbon-containing material prepared in a slurry, liquid or solid state by using a binder, solvent or water may be applied to the surface of the aluminum material by coating, dipping or thermocompression bonding. After the carbon-containing material is stuck to the surface of the aluminum material, the aluminum material may be dried at a temperature range from 20° C. to 300° C. prior to the heat treatment.

In the production method of this invention, the carbon-containing material may contain an aluminum powder. Also, the carbon-containing material may contain ferroelectrics or an oxide having a high dielectric constant with the intention of improving the capacitance of a capacitor.

When a binder is used to stick the carbon-containing material to the surface of the aluminum material in the production method of this invention, synthetic resins such as a carboxy-modified polyolefin resin, vinyl acetate resin, vinyl chloride resin, vinyl chloride/vinyl acetate copolymer resin, vinyl alcohol resin, vinyl fluoride resin, acryl resin, polyester resin, urethane resin, epoxy resin, urea resin, phenol resin, acrylonitrile resin, nitrocellulose resin, paraffin wax and polyethylene wax and natural resins such as wax or tar, glue, poison oak, pine resin and honey wax are preferably used. These binders include those vaporized at the time of heating and those left as carbon precursors in the carbon-containing layer by thermal decomposition corresponding to the molecular weight or type of resin. The binder may be diluted with an organic solvent or the like to adjust its viscosity.

In order to stick the carbon-containing material and an aluminum powder to the surface of aluminum material to form a thick carbon-containing layer in the production method of the present invention, it is preferable to add the aluminum powder in an amount range from 0.01 parts by weight to 10000 parts by weight based on 100 parts by weight of the carbon-containing material.

The method of manufacturing a capacitor electrode member according to this invention may involve a process in which the aluminum material is cooled and reheated, specifically, an activating process, after the process of sticking the carbon-containing material to the surface of the aluminum material and heating the above aluminum material in a space containing a hydrocarbon-containing material.

In this case, the process of cooling and reheating the aluminum material is preferably carried out at a temperature range of 100° C. to less than 660° C.

In the electric double layer capacitor using the electric double layer capacitor electrode member of the present invention, an organic solvent type is preferably used as the electrolyte. The electrolyte is roughly divided into an aqueous type and an organic solvent type among which the organic solvent type electrolyte has high voltage resistance and is effective to extract large energy.

EXAMPLES

Solid electrolytic capacitor electrode members (cathode conductors) were manufactured according to the following Conventional Examples 1 and 2 and Examples 1 to 10. Reference Examples using an aluminum foil coated with carbon was manufactured to compare with Examples.

Conventional Example 1

A 30-μm-thick aluminum hard foil (JIS A1050-H18) was heated in air at 300° C. for 12 hours to manufacture a solid electrolytic capacitor electrode member. The nominal purity of the aluminum foil was 99.55% by mass and the results of mass analysis of the composition were as follows: silicon: 2250 ppm and iron: 3800 ppm.

Conventional Example 2

A 50-μm-thick aluminum soft foil (JIS A1080-O) was subjected to a.c. etching in an electrolyte containing 15% of hydrochloric acid and 0.5% of sulfuric acid in the condition of a temperature of 50° C. and a current density of 0.5 A/cm$^2$ for 50 seconds. Then, the etched aluminum foil was washed and dried to manufacture a solid electrolytic capacitor electrode member.

Examples 1 to 10

A carbon-containing material was applied to each surface of a 30-μm-thick aluminum hard foil (JIS A1050-H18) and dried at a temperature 100° C. for 10 minutes to thereby stick the carbon-containing material to the surfaces of the aluminum hard foil. As to the composition of the carbon-containing material, a mixture prepared by adding 1 part by weight of an acryl resin having an average molecular weight of 3000 and an aluminum powder having an average particle diameter of 1 μm in the amount shown in Table 1 to 1 part by weight of carbon black having an average particle diameter of 0.05 μm was dispersed in toluene such that the solid content was 30%. The carbon-containing material was allowed to stick in the thickness after drying shown in Table 1 on one surface of the aluminum foil.

Thereafter, the aluminum foil to which the carbon-containing material was stuck was heated in the condition of the atmosphere and temperature shown in Table 1 for 12 hours to manufacture a solid electrolytic capacitor electrode member.

Reference Example

A carbon-containing material was applied to each surface of a 30-μm-thick aluminum hard foil (JIS A1050-H18) and dried at a temperature 100° C. for 10 minutes to thereby stick the carbon-containing material to the surfaces of the aluminum hard foil. The composition of the carbon-containing material is a mixture prepared by adding 1 part by weight of polytetrafluoroethylene (PTFE) to 1 part by weight of carbon black (trade name: #2400B, manufactured by Mitsubishi Chemical Co., Ltd.). The carbon-containing material was allowed to stick in a thickness after drying of 2 μm on one surface of the aluminum foil.

Thereafter, the aluminum foil to which the carbon-containing material was stuck was heated in the condition of the atmosphere and temperature shown in Table 1 for 12 hours to manufacture an aluminum foil coated with carbon.

The carbon coated aluminum foil obtained in the above manner corresponds to one obtained in the same manner as in Example 6 except that the heating atmosphere was changed.

Solid electrolytic capacitor electrode members (anode) were manufactured according to in the following Conventional Example 3 and Examples 11 to 14.

Conventional Example 3

A 100-μm-thick aluminum soft foil was subjected to a.c. etching treatment in an electrolyte containing 12% hydrochloric acid and 0.6% phosphoric acid in the condition of a temperature of 40° C. and a current density of 0.5 A/cm$^2$ for 100 seconds. Then, the aluminum soft foil was treated for forming the electrode to 3 V in a 60° C. aqueous solution containing 150 g/L of ammonium adipate. Then, the aluminum foil treated for the formation was washed with water and dried to manufacture a solid electrolytic capacitor electrode member. The nominal purity of the aluminum foil was 99.99% by mass and the results of the analysis of the composition was as follows: silicon: 15 ppm, iron: 16 ppm and copper: 39 ppm.

Examples 11 to 14

A carbon-containing material was applied to each surface of a 30-μm-thick aluminum hard foil (JIS A1050-H18) and dried at a temperature 100° C. for 10 minutes to thereby stick the carbon-containing material to the surfaces of the aluminum hard foil. As to the composition of the carbon-containing material, a mixture prepared by adding 1 part by weight of an acryl resin having an average molecular weight of 3000 and an aluminum powder having an average particle diameter of 1 μm in the amount shown in Table 2 to 1 part by weight of carbon black having an average particle diameter of 0.05 μm was dispersed in toluene such that the solid content was 50%. The carbon-containing material was allowed to stick in the thickness after drying shown in Table 2 on one surface of the aluminum foil.

Thereafter, the aluminum foil to which the carbon-containing material was stuck was heated in the condition of the atmosphere and temperature shown in Table 2 for 12 hours. Then, the aluminum foil was treated for forming the electrode to 3 V in a 60° C. aqueous solution containing 150 g/L of ammonium adipate. Then, the aluminum foil treated for the formation was washed with water and dried to manufacture a solid electrolytic capacitor electrode member.

Each solid electrolytic capacitor electrode member (or carbon coated aluminum foil) obtained in Conventional Examples 1 to 3, Examples 1 to 14 and Reference Example was subjected to measurements to evaluate its capacitance and surface resistance and the adhesion between the carbon-containing layer and the aluminum material. Each evaluation condition is as follows. The results of evaluation are shown in Tables 1 and 2.

(Capacitance)

The capacitance of each sample was measured in an aqueous solution of ammonium adipate or ammonium borate according to Capacitance Measurement Method described in JEITA (Japanese Electronics and Information Technology Industries Association) Standard RC-2364A "Peeling Test Method for Aluminum Electrolytic Capacitor Electrode", Paragraph 7.4.

(Surface Resistance)

The surface resistance was evaluated by an a.c. impedance method.

Each sample was dipped in an aqueous 1M hydrochloric acid solution kept at a liquid temperature of 20° C. to measure an a.c. impedance under a fixed current. The measurement was made at 20 frequencies ranging from 0.5 to 1000 Hz. Generally, the simplest equivalent circuit at the electrode/aqueous solution interface is expressed by a circuit in which a solution resistance is connected in series to a parallel circuit of a charge transfer resistance and an electric double layer capacitor. Therefore, the value of a.c. impedance measured in this condition was expressed as a vector on a complex plane in which the X axis was the real number part and the Y axis was the imaginary number part. Also, the value at the intersecting point with the X axis in the locus of the a.c. impedance of each sample obtained in the above method was adopted as the surface resistance.

(Adhesion)

The adhesion was evaluated by a taping method. An adhesive tape (trade name: Scotch Tape, manufactured by Sumitomo 3M Co., Ltd.) having a 15 mm-wide and 120 mm-length adhesive surface was applied to the surface of the carbon-containing layer in a sample of the solid electrolytic capacitor electrode member having a 10 mm-wide and 100 mm-length. Then, the adhesive tape was peeled off to evaluate the adhesion according to the following equation.

Adhesion (%)={Weight of the carbon-containing layer after peeled (mg)/Weight of the carbon-containing layer before peeled (mg)}×100 tance can be obtained if the solid electrolytic capacitor electrode member of the present invention is used to constitute the solid electrolytic capacitor.

Next, electric double layer capacitor electrode member foils were manufactured in the following Conventional Examples 4 and 5 and Examples 15 to 17.

Conventional Example 4

Both surfaces of a 30-μm-thick aluminum hard foil (JIS A1050-H18) were processed by etching treatment carried out in an electrolyte at a temperature of 50° C. containing 15% by volume of hydrochloric acid and 0.5% by volume of sulfuric acid at a current density of 0.4 A/cm$^2$ for 60 seconds. An electrode member obtained by compounding activated carbon (manufactured by Nippon) Kynol Inc. having a specific surface area of 2200 m$^2$/g, acetylene black (manufactured by Mitsubishi Chemical Co., Ltd.) having an average particle diameter of 28 nm and polytetrafluoroethylene (PTFE) in a ratio by mass of 8:1:1 was applied to the etched aluminum foil

TABLE 1

| | Carbon-containing layer, thickness (μm/one surface) | Amount of Al powder (parts by weight) | Heating atmosphere | Heating temperature (° C.) | Capacitance (μF/cm$^2$) | Surface resistance (Ω) | Adhesion (%) |
|---|---|---|---|---|---|---|---|
| Conventional Example 1 | — | — | Air | 300 | 5 | $2.0 \times 10^3$ | — |
| Conventional Example 2 | — | — | — | — | 98 | $2.7 \times 10^2$ | — |
| Example 1 | 0.3 | — | Methane gas | 550 | 77 | $8.4 \times 10$ | 92 |
| Example 2 | 0.5 | — | Methane gas | 550 | 161 | $6.2 \times 10$ | 89 |
| Example 3 | 2 | — | Acetylene gas | 400 | 95 | $8.9 \times 10$ | 63 |
| Example 4 | 2 | — | Acetylene gas | 450 | 407 | $6.7 \times 10$ | 80 |
| Example 5 | 2 | — | Methane gas | 500 | 483 | $6.1 \times 10$ | 87 |
| Example 6 | 2 | — | Methane gas | 550 | 504 | $5.6 \times 10$ | 96 |
| Example 7 | 2 | — | Methane gas | 600 | 523 | $5.7 \times 10$ | 96 |
| Example 8 | 2 | 0.2 | Methane gas | 550 | 510 | $6.2 \times 10$ | 97 |
| Example 9 | 2 | 1 | Methane gas | 550 | 491 | $6.0 \times 10$ | 98 |
| Example 10 | 5 | 1 | Methane gas | 550 | 582 | $6.8 \times 10$ | 98 |
| Reference Example | 2 | — | Nitrogen gas | 550 | 4 | $1.4 \times 103$ | 7 |

TABLE 2

| | Carbon-containing layer, thickness (μm/one surface) | Amount of Al powder (parts by weight) | Heating atmosphere | Heating temperature (° C.) | Capacitance (μF/cm$^2$) | Surface resistance (Ω) | Adhesion (%) |
|---|---|---|---|---|---|---|---|
| Conventional Example 3 | — | — | Nitrogen gas | 300 | 211 | $1.1 \times 10^2$ | — |
| Example 11 | 50 | 1 | Methane gas | 550 | 303 | $6.7 \times 10$ | 97 |
| Example 12 | 500 | 1 | Methane gas | 550 | 379 | $7.3 \times 10$ | 85 |
| Example 13 | 5,000 | 1 | Methane gas | 550 | 384 | $7.5 \times 10$ | 79 |
| Example 14 | 7,500 | 1 | Methane gas | 550 | 225 | $9.5 \times 10$ | 54 |

It is understood from the results of Tables 1 and 2 that each solid electrolytic capacitor electrode member obtained in Examples 1 to 14 has a higher capacitance, a lower surface resistance and higher adhesion than the solid electrolytic capacitor electrode members of Conventional Examples 1 to 3 and the carbon coated aluminum foil of Reference Example. In other words, it is understood that each solid electrolytic capacitor electrode member obtained in Examples 1 to 14 can reduce the surface resistance and also increase the capacitance of the solid electrolytic capacitor and therefore, a solid electrolytic capacitor having a low ESR and a high capacito form an electrode layer. Then, the aluminum foil was rolled such that the thickness of the electrode layer on one surface of the foil was 100 μm to manufacture an electric double layer capacitor electrode member.

Conventional Example 5

Activated carbon (manufactured by Nippon Kynol Inc., acetylene black (manufactured by Mitsubishi Chemical Co., Ltd.) and PTFE were compounded in a ratio by mass of 8:1:1 to manufacture a sheet electrode member 100 μm in thickness. Thereafter, the above sheet electrode member was applied to each surface of the etched aluminum foil used in Conventional Example 4 by using a gravure coater with applying an adhesive prepared by compounding graphite with PTFE in a ratio by mass of 7:3 in a thickness of 2 μm/one surface, to manufacture an electric double layer capacitor electrode member.

Example 15

A carbon-containing material was applied to both surfaces of a 30-μm-thick aluminum hard foil (JIS A1050-H18) and dried at a temperature 100° C. for 10 minutes to thereby stick the carbon-containing material to the surfaces of the aluminum hard foil. The composition of the carbon-containing material was a mixture prepared by adding 1 part by weight of an acryl resin, 1 part by weight of an aluminum powder and 0.1 parts by weight of acetylene black (manufactured by Mitsubishi Chemical Co., Ltd.) to 1 part by weight of avtivated carbon (manufactured by Nippon Kynol Inc. The carbon-containing material was allowed to stick in a dry thickness of 100 μm on one surface of the aluminum foil.

Thereafter, the aluminum foil to which the carbon-containing material was stuck was heated at 600° C. in a methane gas atmosphere for 12 hours to thereby manufacture an electric double layer capacitor electrode member.

Example 16

A carbon-containing material was applied to both surfaces of a 30-μm-thick aluminum hard foil (JIS A1050-H18) and dried at a temperature 150° C. for 10 minutes to thereby stick the carbon-containing material to the surfaces of the aluminum hard foil. The composition of the carbon-containing material was a mixture prepared by adding 1 part by weight of polyvinyl alcohol (PVA) and 0.2 parts by weight of acetylene black (manufactured by Mitsubishi Chemical Co., Ltd.) to 1 part by weight of activated carbon (manufactured by Nippon Kynol Inc.). The carbon-containing material was allowed to stick in a dry thickness of 100 μm on one surface of the aluminum foil.

Thereafter, the aluminum foil to which the carbon-containing material was stuck was heated at 600° C. in a methane gas atmosphere for 12 hours to thereby manufacture an electric double layer capacitor electrode member.

Example 17

A carbon-containing material was applied to both surfaces of a 30-μm-thick aluminum hard foil (JIS A1050-H18) and dried at a temperature 200° C. for 10 minutes to thereby stick the carbon-containing material to the surfaces of the aluminum hard foil. The composition of the carbon-containing material was a mixture prepared by adding 1 part by weight of polyvinyl alcohol (PVA) and 0.2 parts by weight of acetylene black (manufactured by Mitsubishi Chemical Co., Ltd.) to 1 part by weight of activated carbon (manufactured by Nippon Kynol Inc.). The carbon-containing material was allowed to stick in a dry thickness of 100 μm on one surface of the aluminum foil.

Thereafter, the aluminum foil to which the carbon-containing material was stuck was heated at 600° C. in a methane gas atmosphere for 12 hours and then at 400° C. in air for 2 hours to thereby manufacture an electric double layer capacitor electrode member.

Each electric double layer capacitor electrode member foil obtained in Conventional Examples 4 to 5 and Examples 15 to 17 was subjected to measurements to evaluate the adhesion between the carbon-containing layer and the aluminum foil, surface resistance and capacitance-to-active material ratio. Each evaluation condition is as follows. The results of evaluation are shown in Table 3.

(Adhesion)

The adhesion was evaluated by a taping method. An adhesive tape (trade name: Scotch Tape, manufactured by Sumitomo 3M Co., Ltd.) having a 15-mm-wide and 120-mm-length adhesive surface was applied to the surface of the carbon-containing layer in a sample of a 10-mm-wide and 100-mm-long electric double layer capacitor electrode. Then, the adhesive tape was peeled off to evaluate the adhesion according to the following equation.

Adhesion (%)={Weight of the carbon-containing layer after peeled (mg)/Weight of the carbon-containing layer before peeled (mg)}×100

(Surface Resistance)

The surface resistance was evaluated by an a.c. impedance method.

Each sample was dipped in an aqueous 1M hydrochloric acid solution kept at a liquid temperature of 20° C. to measure an a.c. impedance under a fixed current. The measurement was made at 20 frequencies ranging from 0.5 to 1000 Hz. Generally, the simplest equivalent circuit at the electrode/aqueous solution interface is expressed by a circuit in which a solution resistance is connected in series to a parallel circuit of a charge transfer resistance and an electric double layer capacitor. Therefore, the value of a.c. impedance measured in this condition was expressed as a vector on a complex plane in which the X axis was the real number part and the Y axis was the imaginary number part. Also, the value at the intersecting point with the X axis in the locus of the a.c. impedance of each sample obtained in the above method was adopted as the surface resistance.

(Capacitance-to-Active Material Ratio)

A value obtained by dividing the capacitance calculated from the quantity of electricity discharged after charged under d.c. current by the weight of the electrode layer was adopted as the capacitance-to-active material ratio.

The capacitance of each sample was measured in an aqueous solution of tetraethylammonium tetrafluoroborate according to Capacitance Measurement Method described in JEITA (Japan Electronics and Information Technology Industries Association) Standard RCR-2370A "Guideline of matters that require attention in the use of a solid electric double layer capacitor", Paragraph 6.2.1. and Standard RC-2377 "Test Method of Electric Double Layer Capacitor", in the following condition: discharge current: 0.3 mA/cm$^2$, measurement start voltage: 1 V and measurement termination voltage: 2.7 V.

TABLE 3

|  | Adhesion (%) | Surface resistance (Ω) | Capacitance-to-active material ratio (F/g) |
| --- | --- | --- | --- |
| Conventional Example 4 | 50 | $2.2 \times 10^4$ | 23 |
| Conventional Example 5 | 38 | $2.3 \times 10^2$ | 28 |
| Example 15 | 99 | $5.7 \times 10$ | 30 |
| Example 16 | 98 | $5.6 \times 10$ | 34 |
| Example 17 | 98 | $5.6 \times 10$ | 50 |

It is understood from the results of Table 3 that each electric double layer capacitor electrode member obtained in Examples 15 to 17 has higher adhesion, a lower surface resistance and a higher capacitance-to-active material ratio than the electric double layer capacitor electrode members obtained in Conventional Examples 4 and 5. In other words, it is understood that each electric double layer capacitor electrode member obtained in Examples 15 to 17 can reduce the surface resistance and also increase the capacitance of the electric double layer capacitor and therefore, an electric double layer capacitor having a high output and a high capacitance can be obtained if the electric double layer capacitor electrode member of the present invention is used to constitute the electric double layer capacitor.

The foregoing disclosed embodiments and examples are therefore considered to be illustrative and should not be interpreted as restrictive. The scope of this invention is shown not by the foregoing embodiments and examples but by the claims and this invention embraces all changes and modifications that fall within equivalence of claims.

INDUSTRIAL APPLICABILITY

When a solid electrolytic capacitor electrode member which is one type of capacitor electrode member according to this invention is used to constitute a solid electrolytic capacitor, a low-ESR and high-capacitance capacitor can be attained. Also, when an electric double layer capacitor electrode member which is one type of capacitor electrode member according to this invention is used to constitute an electric capacitor, a high-output and high-capacitance capacitor can be attained.

The invention claimed is:

1. A capacitor electrode member comprising:
   aluminum material (1);
   a carbon-containing layer (2) formed on the surface of said aluminum material (1); and
   an interposition layer (3) containing an aluminum element and a carbon element, the interposition layer being formed between said aluminum material (1) and said carbon-containing layer (2), wherein;
   said interposition layer (3) includes a first surface portion (3) which is formed on at least a part of the region of the surface of said aluminum material (1) and contains a carbide of aluminum;
   said carbon-containing layer (2) includes a second surface portion (21) formed so as to extend outward from said first surface portion (3); and
   said carbon-containing layer (2) further includes carbon particles (22) and said second surface portion (21) is formed between said first surface portion (3) and said carbon particles (22) and contains a carbide of aluminum.

2. The capacitor electrode member according to claim 1, wherein said carbon-containing layer (2) further includes aluminum particles (23), an aluminum particle surface part (24) which is formed on at least a part of the region of the surface of said aluminum particles (23) and contains a carbide of aluminum and an aluminum particle outside part (25) which is formed so as to extend to the outside of the surface of said aluminum particles (23) from said aluminum particle surface part (24) and contains a carbide of aluminum.

3. The capacitor electrode member according to claim 1, wherein said carbon-containing layer (2) includes an interposition material containing an aluminum element and a carbon element in its inside.

4. The capacitor electrode member according to claim 1, wherein said interposition material is a compound of an aluminum element and a carbon element.

5. The capacitor electrode member according to claim 1, wherein said carbon-containing layer (2) is a compound of an aluminum element and a carbon element.

6. The capacitor electrode member according to claim 1, wherein said carbon-containing layer (2) is formed so as to extend outward from the surface of said aluminum material.

7. The capacitor electrode member according to claim 1, wherein the thickness of said aluminum material (1) is 5 µm or more and 1 mm or less.

8. The capacitor electrode member according to claim 1, said capacitor electrode member being a solid electrolytic capacitor electrode member.

9. The capacitor electrode member according to claim 8, wherein the thickness of said carbon-containing layer (2) formed on one surface of said aluminum material (1) is 0.01 µm or more and 5 mm or less.

10. The capacitor electrode member according to claim 1, said capacitor electrode member being an electric double layer capacitor electrode member.

11. The capacitor electrode member according to claim 10, wherein the thickness of said carbon-containing layer (2) formed on one surface of said aluminum material (1) is 0.01 µm or more and 10 mm or less.

12. A capacitor provided with an electrode member;
    said electrode member comprising:
    an aluminum material (1);
    a carbon-containing layer (2) formed on the surface of said aluminum material (1); and
    an interposition layer (3) containing an aluminum element and a carbon element, the interposition layer being formed between said aluminum material (1) and said carbon-containing layer (2), wherein;
    said interposition layer (3) includes a first surface portion (3) which is formed on at least a part of the region of the surface of said aluminum material (1) and contains a carbide of aluminum;
    said carbon-containing layer (2) includes a second surface portion (21) formed so as to extend outward from said first surface portion (3); and
    said carbon-containing layer (2) further includes carbon particles (22) and said second surface portion (21) is formed between said first surface portion (3) and said carbon particles (22) and contains a carbide of aluminum.

13. The capacitor according to claim 12, the capacitor being a solid electrolytic capacitor.

14. The capacitor according to claim 12, the capacitor being an electric double layer capacitor.

15. A method of manufacturing a capacitor electrode member, comprising the steps of sticking a carbon-containing material to the surface of aluminum material; and heating said aluminum material with the carbon containing material stuck to the surface thereof in the situation where the aluminum material is disposed in a closed space filled singly with a hydrocarbon containing material.

16. The method of manufacturing a capacitor electrode member according to claim 15, wherein said capacitor electrode member is a solid electrolytic capacitor electrode member.

17. The method of manufacturing a capacitor electrode member according to claim 15, wherein said capacitor electrode member is an electric double layer capacitor electrode member.

* * * * *